United States Patent [19]

Xanthopoulos

[11] Patent Number: 5,469,692

[45] Date of Patent: Nov. 28, 1995

[54] METHODS FOR CONFIGURING, PACKAGING AND RECONFIGURING PERSONAL COMPUTERS

[75] Inventor: Eric Xanthopoulos, Santa Clara, Calif.

[73] Assignee: Apple Computer, Inc., Sunnyvale, Calif.

[21] Appl. No.: 271,959

[22] Filed: Jul. 8, 1994

[51] Int. Cl.$^6$ .................... B65B 17/00; B65B 55/20
[52] U.S. Cl. .................... 53/474; 53/50; 53/472
[58] Field of Search ............... 53/474, 472, 473, 53/468, 467, 50, 566, 564, 169, 238, 237, 157, 156, 155, 154; 206/320, 305

[56] References Cited

U.S. PATENT DOCUMENTS

| | | | |
|---|---|---|---|
| 3,482,895 | 12/1969 | Becklin | 206/305 X |
| 4,398,212 | 8/1983 | Serry et al. | 206/320 X |
| 4,658,298 | 4/1987 | Takeda et al. | 206/320 X |
| 4,837,590 | 6/1989 | Sprague | 206/305 X |
| 5,377,476 | 1/1995 | Böhmer et al. | 53/255 |

*Primary Examiner*—James F. Coan
*Attorney, Agent, or Firm*—Burns, Doane, Swecker & Mathis

[57] ABSTRACT

Housings for personal computers are assembled at a first site and then shipped in bulk to one or more configuring sites. At the configuring sites, electrical components are inserted into the housing, and the thus-configured computers are packaged in individual containers, along with packing material. Each container has an openable vertical wall. If the computers need to be reconfigured, the openable wall of the container is opened, and one or more of the electrical components are removed and/or replaced horizontally through that opened wall without having to remove the computer or packing material from the container.

13 Claims, 9 Drawing Sheets

METHODS FOR CONFIGURING, PACKAGING AND RECONFIGURING PERSONAL COMPUTERS

RELATED INVENTIONS

The subject matter of this invention is related to that of my concurrently filed U.S. applications Ser. No. 08/271,958 and Ser. No. 08/272,322 (Attorney Docket Nos. P1187/035 and P1188/036, respectively), and the disclosures thereof are incorporated herein by reference.

BACKGROUND OF THE INVENTION

The present invention relates to the manufacture/assembling, shipping, configuring and reconfiguring of computers, especially personal computers.

Traditionally, personal computers have been manufactured by simultaneously assembling together the housing and at least most of the functional electrical components, such that once assembled, the computer is ready to be tested and shipped to distribution centers. One shortcoming is that if any subsequent reconfiguring of the computer to change its operational characteristics (e.g., add or remove certain drives, extend memory, add or remove expansion boards, etc.) requires that the computer be substantially disassembled. Not only is that time consuming and burdensome, but in cases where the computers need to be reconfigured after they have been packaged in shipping containers, it is necessary for workers to first open the containers, remove the packing material and lift the computers out of the containers, thereby risking physical injury, especially back injury, due to repeated bending and lifting.

A computer has been proposed which has a housing with a removable top cover that enables the computer to be reconfigured without being removed from the container. However, it is still necessary for the workers to remove the packing material and to perform an appreciable disassembling of the computer. Also, those efforts require that the workers perform repeated bending motions in order to reach down into the container, thereby risking physical injury as noted above.

Also, conventional computers are constructed such that their aesthetic appearance is produced by the configuration of walls which are integral with the computer housing, whereby the appearance of the computer cannot be reconfigured without completely disassembling the computer.

SUMMARY OF THE INVENTION

The present invention relates to a method of handling a personal computer. The computer is assembled by installing electrical components into a housing. The computer is packaged in a shipping container having an openable vertical end wall. The packaged computer is reconfigured by removing at least one of the electrical components horizontally through a vertical side of the housing and horizontally through the vertical end wall of the container while the computer remains disposed in the container.

Preferably, the housing is fabricated at a remote site, and then shipped in bulk together with other housings to a configuring site where the computers are to be configured.

Exterior panels are mounted on the housing, and the exterior panel disposed adjacent the openable vertical end wall of the container is removable in a horizontal direction.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which:

FIG. 16 is an end view of the track depicted in FIG. 15;

DETAILED DESCRIPTION OF A PREFERRED EMBODIMENT OF THE INVENTION

Figure 1:
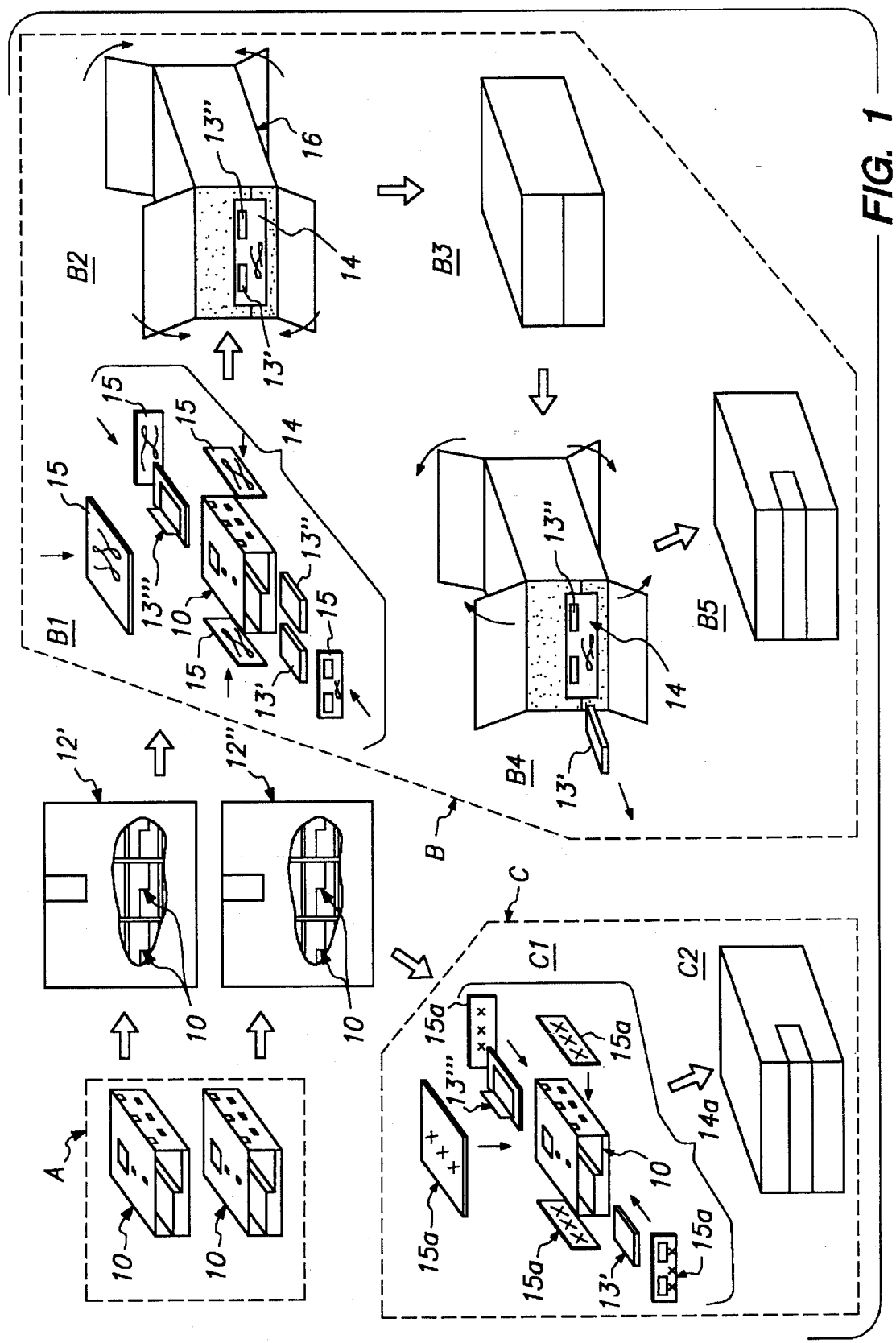
FIG. 1 is a schematic diagram depicting the steps involved in the manufacture, shipping, configuring and reconfiguring of personal computers in accordance with the present invention.

Depicted in FIG. 1 is a flow diagram of a personal computer during assembly, shipping, configuring and reconfiguring thereof in accordance with the present invention.

At a first site, which could be designated as a central mass production facility A, identical computer housings or core modules 10 are manufactured en masse and are then shipped in bulk in common containers 12', 12" to various second sites B, C, etc., located remote from the first site A, and which could be designated as configuration centers B. For example, containers 12' are shipped to a first configuration center B, and containers 12" are shipped to a second configuration center C located remotely from the configuration center B.

At the first configuration center B, the housings 10 are removed from the common container 12, functional electrical components 13 are mounted therein, and exterior panels or walls 15 (e.g., decorative panels) are mounted on the outside of the housings, to form fully configured computers 14 (see step B1). The computers 14 are tested and packaged into individual shipping containers 16, along with packing material (see steps B2 and B3).

If it becomes necessary, as is not uncommon, for the computers 14 to be reconfigured in order to incorporate recent innovations or a customer's changes, such reconfiguring can be carried out without removing the computer from its container. For example, see step B4 wherein one of the functional electrical components 13' is being removed from the computer 14 which remains in its container 16. Further testing of the reconfigured could also be carried out without removing the computer from the container 16.

The container with the reconfigured computer 14 can now be sealed (step B5) and sold directly from site B or shipped to another site such as a distribution site (not shown). At the distribution site, additional reconfiguring could be performed without removing the computer from the container 16. Thus, the computer 14 could be transferred to the purchaser while still in the container 16.

Note that at each of the configuration sites B, C computers having different operational and aesthetic characteristics can be created. For example, in FIG. 1, a computer 14A is being configured which has only the electrical components 13' and 13''' and which has exterior panels 15A of different appearance from the computer 14 being configured at site B. Of course, a similar computer 14A could be configured at site B.

The computer 14A which has been configured at 10 site C is packaged for shipment (see step C2) without being reconfigured.

There will now be described details concerning the steps described above. An even more detailed description can be found in the above-referenced concurrently filed U.S. Ser. No. 08/271,958 and Ser. No. 08/272,322.

Figure 2:
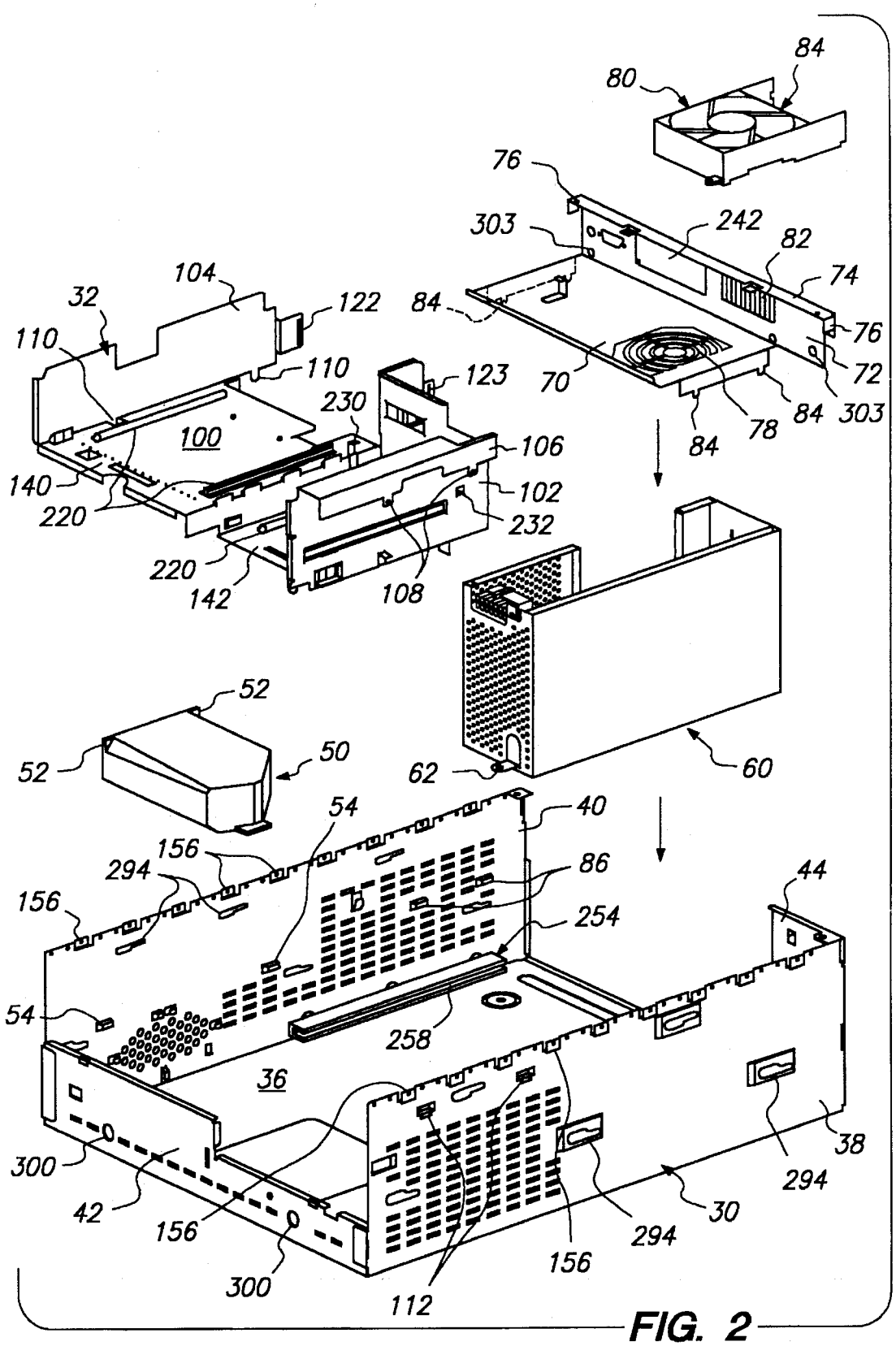
FIG. 2 is an exploded top perspective view of a computer housing assembled at a mass production site.

With reference to FIG. 2, the fabrication of a housing 10 at the central mass production facility A is initiated by forming a metallic base 30, preferably by bending sheet material, such as aluminum. Also formed are front and rear sub-chassis 32, 34 preferably of sheet metal such as aluminum. The base 30 includes a floor 36, two upright side walls 38, 40, a partial front wall 42, and a partial rear wall 44.

Installed downwardly into the base 30 so as to be supported on the floor 36 is a conventional speaker assembly 50. The speaker assembly can be attached to the base in any suitable manner, best preferably includes an end plate 52, the vertical edges of which slide vertically downwardly into spaces defined by two hooks 54 formed on the side wall 40 of the base.

Also installed vertically downwardly onto the floor 36 of the base 30 is a conventional power supply assembly 60. The power supply assembly 60 can be attached to the base in any suitable manner, but preferably includes an apertured tab 62 which can receive a fastener such as a screw for securing the power supply assembly 60 to the floor 36.

The rear sub-chassis 34 includes a horizontal table 70 and a vertical back plate 72. An upper edge of the back plate is bent to form a horizontal flange 74 having downwardly projecting ears 76 at its ends. The table 70 includes a series of through-slots 78 formed therein, and a fan assembly 80 is mounted onto the table 70 in overlying relationship to the through-slots 78. The fan assembly can be secured to the table in any suitable manner, e.g. by fasteners such as screws. Through-holes 82 are formed in the back plate so that when a blade/motor unit 84 of the fan assembly is rotated, an air flow is established which draws air from inside the base and conducts it through the through-slots 78 and then through the through-holes 82.

The rear sub chassis 70 also includes space next to the fan assembly for the subsequent attachment of expansion boards, such as a T.V. tuner board and video output board at the configuring facility B as will be discussed hereinafter.

Figure 14:
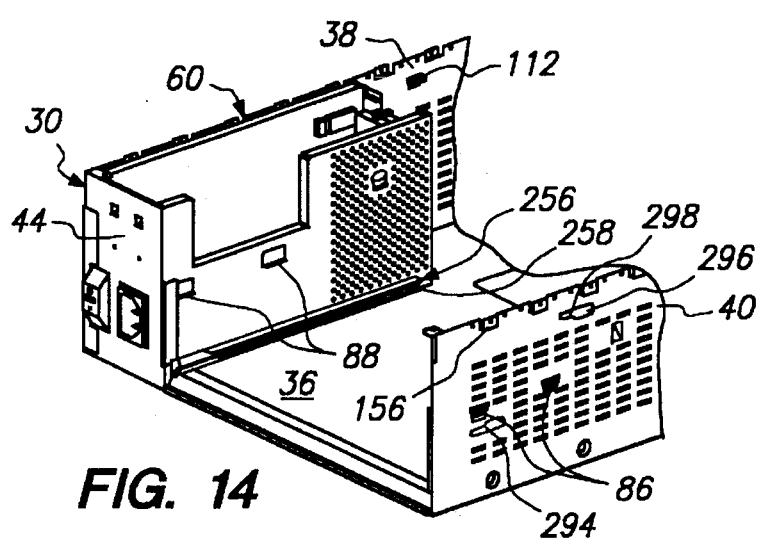
FIG. 14 is a fragmentary top perspective view of the rear end of the computer base depicted in FIG. 2, after a power supply assembly has been installed therein.

Installation of the rear sub-chassis 34 into the base is achieved in a vertically downward direction so as to cause downwardly projecting tabs 84 formed on the table 70 to enter vertically open slots 86, 88 formed in the base. Two of those slots 86 are formed in the side wall 40 of the base, whereas the other two slots 88 are formed in a wall of the power supply assembly 60 (see FIG. 14).

Figure 13:
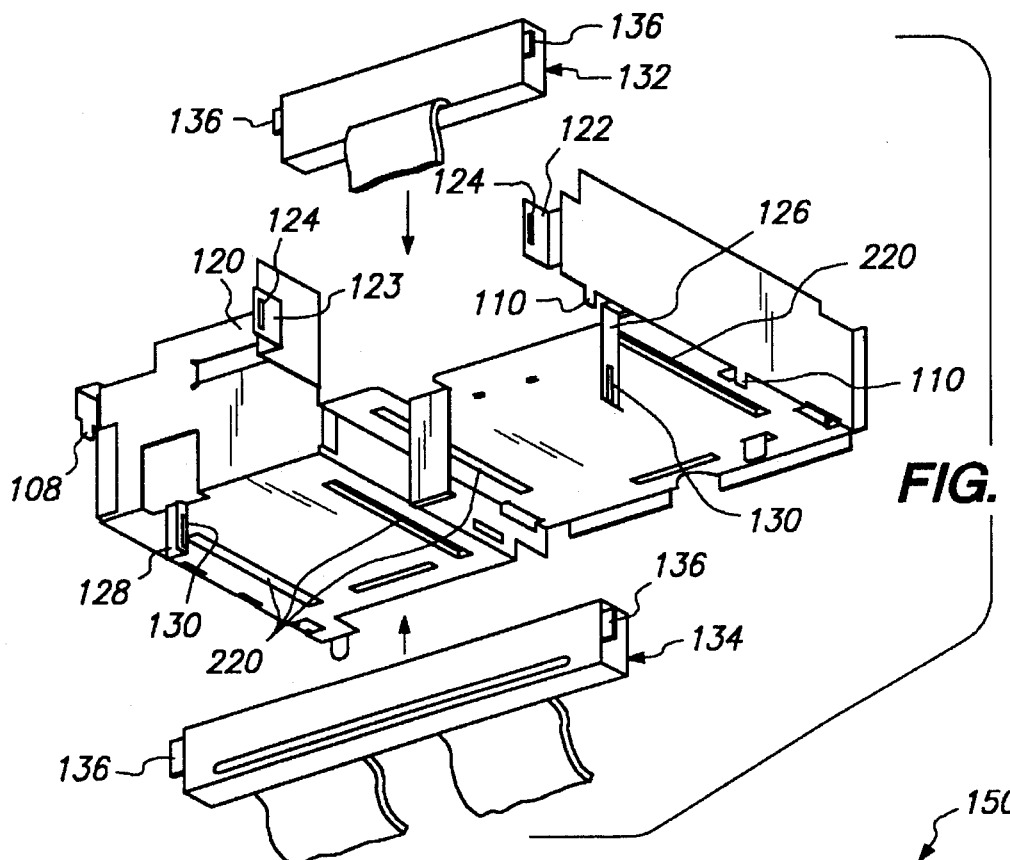
FIG. 13 is a bottom perspective view of a front sub-chassis depicted in FIG. 2, as electrical connectors are being installed therein.

The front sub-chassis 32 includes a bottom wall 100 and a pair of upstanding side walls 102, 104. An upper edge of the side wall 102 is folded over about a pair of horizontal fold lines to form a vertical outer flange 106 having two downwardly projecting tabs 108. The other side wall 104 has a pair of tabs 110 projecting downwardly from its lower edge (see also FIG. 13). When the front sub-chassis 32 is inserted downwardly into the base 30, the tabs 108 are inserted into vertically open slots 112 formed by bent portions of the side wall 38, and the tabs 110 are inserted into the vertically open slots 54 formed by bent portions of the side wall 40.

Projecting rearwardly from a rear wall 120 of the front sub-chassis is a bracket 123 (see FIGS. 2, 13), which has a vertical slit 124 therein. Another bracket 122 projects rearwardly from the sided wall 104 and also includes a slot 124 aligned with the aforementioned slot 124. Likewise, a bracket 126 projects downwardly from the side wall 104, and a bracket 128 project downwardly from the rear wall 120. Each of the brackets 126 and 128 has a vertical slit 130, the slits 130 being aligned with one another. The pair of brackets 122, 123 is adapted to receive an upper multi-pin connector 132 (see FIG. 13), and the pair of brackets 126, 128 is adapted to receive a lower multi-pin connector 134. The multi-pin connectors 132, 134 are preferably CD and MLB Foxconn connectors which have flanges 136 projecting from opposite ends. By flexing apart the associated pairs of brackets 122, 123 and 126, 128, the respective connectors 132, 134 can be inserted therebetween such that the flanges 136 enter the respective pairs of slits 124 and 130.

The first sub-chassis 32 also forms a pair of side-by-side bays or compartments 140, 142 for receiving drive assemblies, as will be discussed hereinafter.

Figure 3:
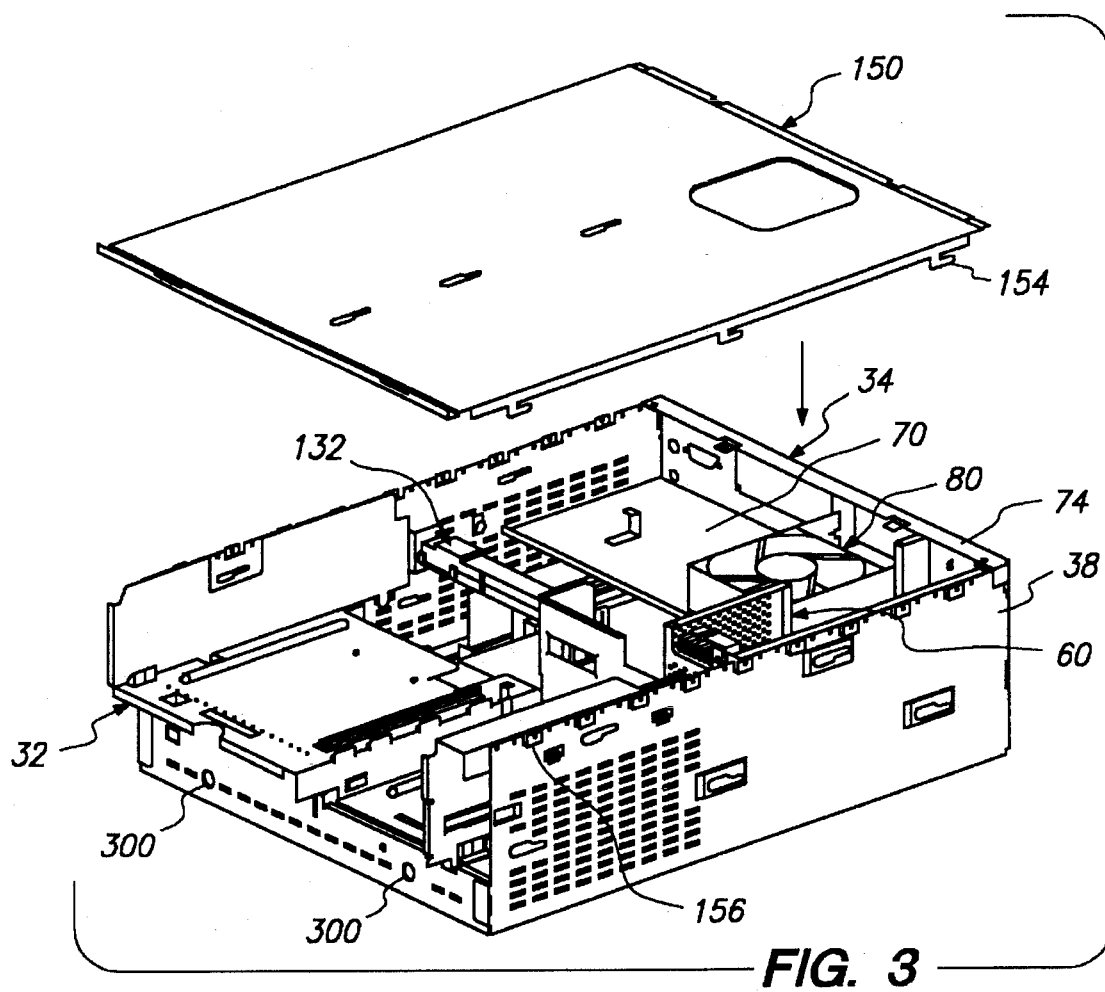
FIG. 3 is a top perspective view of the housing, following assemblage of the parts depicted in FIG. 2, and further depicting a top cover.
Figure 17:
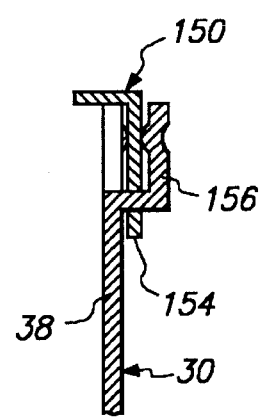
FIG. 17 is a sectional view taken along the line 17—17 in FIG. 4.

After the speaker assembly 50, the power supply assembly 60, the rear sub-chassis 34 (together with the fan assembly 80), and the front sub-chassis 32 (together with the connectors 132, 134) have been installed vertically downwardly into the base 30, a top cover 150 is installed (see FIG. 3). The top cover 150 is formed of sheet metal, preferably aluminum. Projecting downwardly from side edges of the top cover 150 are L-shaped tabs 154 which are connected to respective outwardly bent ears 156 formed on the side walls 38, 40 of the base in response to rearward movement of the top cover relative to the base (see also FIG. 17). The rear edge of the top cover becomes disposed beneath the upper flange 74 of the rear sub-chassis.

Figure 4:
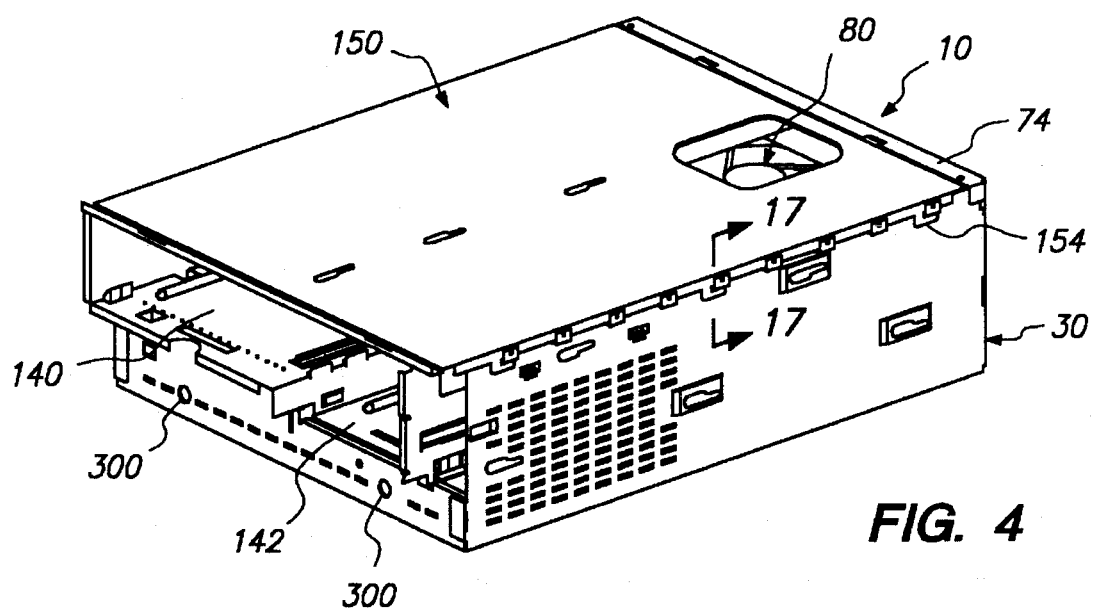
FIG. 4 is a top perspective view of a computer housing formed in accordance with the present invention.
Figure 5:
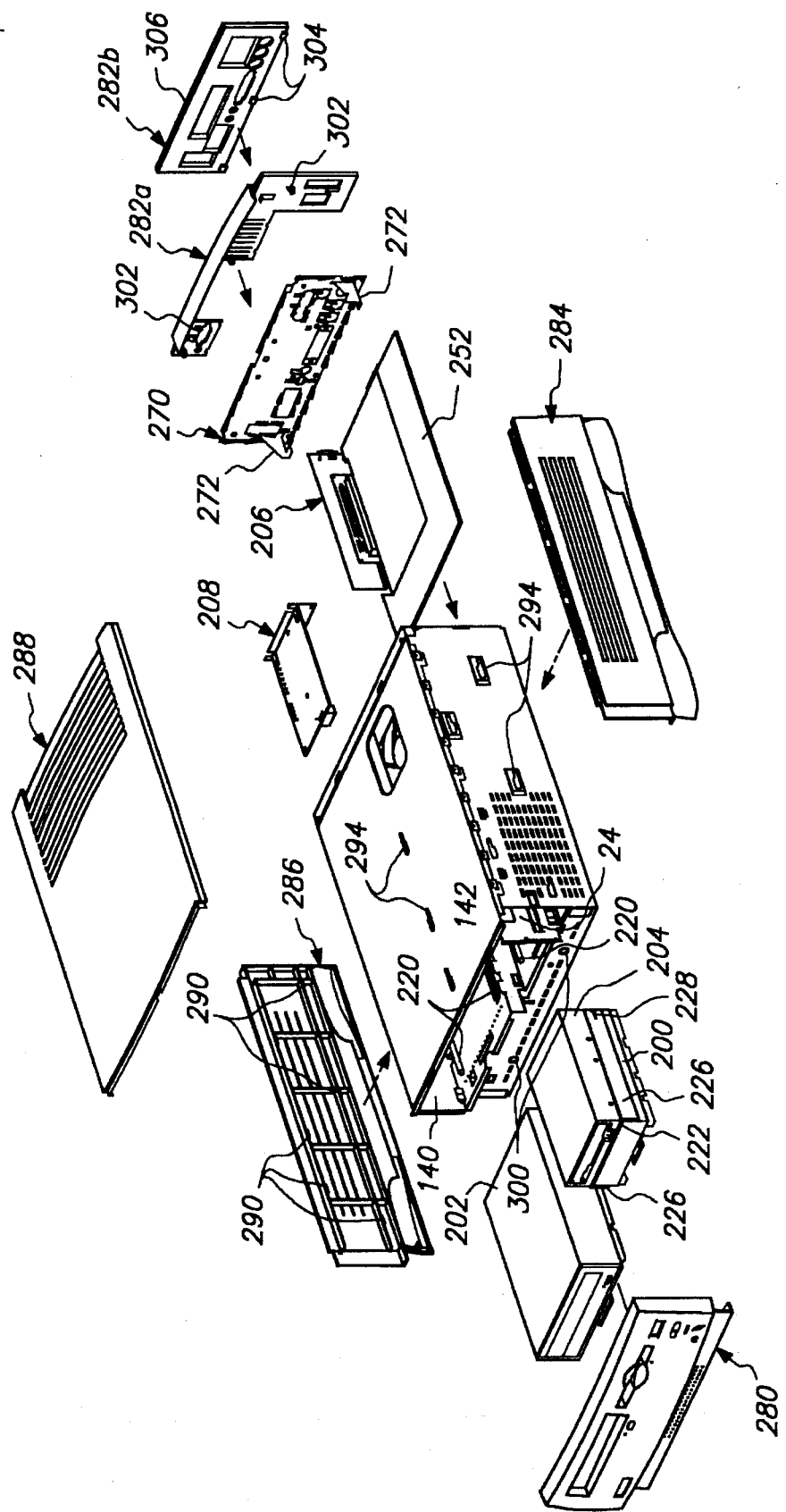
FIG. 5 is a top perspective exploded view as the housing of FIG. 4 as it is being configured with electrical components and exterior panels.

The thus-assembled housing 10, depicted in FIG. 4, is then bulk shipped along with other similar housings 10 in containers 12 (see FIG. 1) to the various configuring sites B, C. At the configuring sites, the top cover 150 is removed, and the computer is configured (see FIG. 5) by the installation of electrical components such as, for example, a hard drive assembly 200, a CD assembly 202, a floppy drive assembly 204, a logic board assembly 206, and expansion boards such as a TV tuner board 208. The hard drive assembly 200 and the CD assembly 202 slide into the compartments 142, 140, respectively, formed in the front sub-chassis 32 of the housing. Each compartment 142, 140 has two bent-up strips 220 which form parallel tracks for receiving corresponding tracks disposed on the undersides of the hard drive 200 and CD assembly 202. The CD assembly 202 plugs into the upper connector 132.

The floppy drive 204 is mounted on a floppy carrier 222 in the form of a metal plate. That floppy carrier has holes 224 for receiving vertical posts (not shown) disposed on the underside of the floppy drive. The floppy carrier 222 is mounted in the front sub-chassis 32 above the hard drive 200 in any suitable manner. Preferably, side flanges 226 of the floppy carrier 222 have front edges in which horizontal slots 228 are formed (only one shown in FIG. 5). Each slot 228 is adapted to slide over a horizontal strip of metal formed by bent portions of the front sub-chassis 32. For example, a piece 230 of the bottom wall 100 of that sub-chassis 32 is bent upwardly (see FIG. 2), and an upper portion of that piece 230 is bent horizontally to form one of the strips. Also, a piece 232 of the side wall 102 of the sub-chassis 32 is bent horizontally to form the other strip which is coplanar with the first horizontal strip.

The TV tuner board 208 is inserted horizontally through a hole 242 (see FIG. 2) formed in the back plate 72 and is fastened to that back plate 72 by fasteners such as screws.

The housing 10 also forms a front compartment 244 into which another electrical component, such as a headphone assembly (not shown) can be horizontally inserted.

The logic board assembly 206 is inserted horizontally into a compartment disposed within the base 10 beneath the rear sub-chassis 34, and plugs into the lower connector 134. That logic board assembly 206 can be of any desired configuration and preferably includes a horizontal board 252 which slides into tracks 254, 256 that have been previously installed in the base. Those tracks 254, 256 are depicted in FIGS. 2 and 14–16, respectively. Each track includes a horizontal slot 258 and a plurality of cylindrical mounting protrusions 260 configured to snap into mounting holes formed in the base side wall 40 and a side wall of the power supply assembly 60, respectively. The tracks, which can be of any desired material such as plastic, can be installed at either of the sites A, B, etc. The side edges of the board 252 slide horizontally along within the slots 258 of the respective tracks 254, 256 to facilitate insertion and removal of the logic board assembly 250.

Attached to a rear edge of the logic board assembly 206 is a fence plate 270. The fence plate 270 includes two arms 272 which contain holes so that fasteners, such as screws, can attach the fence plate 270 to the board 252. The fence plate 270 is formed of metal, such as aluminum and closes off (i.e., completes the shield for) the rear region of the housing 10 located beneath the back plate 72 of the rear sub-chassis 34. The rear fence plate 270 is attached to the back plate 72 by fasteners such as screws.

Figure 18:
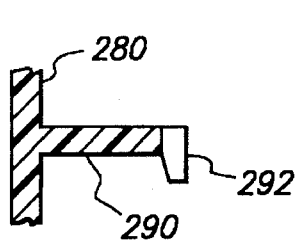
FIG. 18 is a sectional view taken through a mounting finger of an exterior decorative panel according to the present invention.
Figure 15:
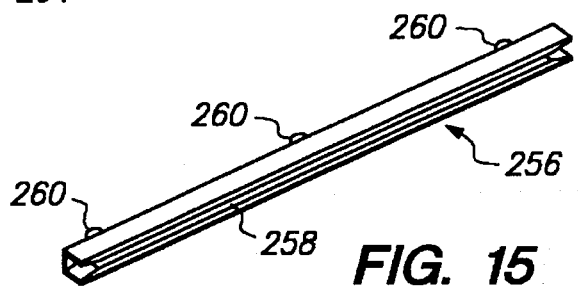
FIG. 15 is a top perspective view of a track member according to the present invention.

Once the desired electrical components (selected from among those described above, as well as other conventional components) have been installed into the housing, then front, rear, side and top exterior panels (or walls) 280, 282a, 282b, 284, 286 and 288 are mounted on the front, back, sides, and top of the housing. The exterior (decorative) panels can be connected in any suitable manner, e.g. by fasteners such as screws, but are preferably connected without the use of separate fasteners. For example, each of the side and top panels 284, 286, 288, carries horizontal fingers 290, the ends of which have vertical portions 292 (see FIG. 18). Those fingers 290 are adapted to be mounted in horizontal slots 294 formed in the side walls 38, 40 of the base and in the top cover 150. Each of the slots 294 has a wide portion 296 and a narrow portion 298 (see FIG. 14). The fingers are inserted into respective wide portions 296 and then become locked within the narrow portions 298 after the respective exterior panel is shifted horizontally. To remove the panel, it is shifted horizontally in the reverse direction until the fingers enter the wide portions 296 of the slots.

The front exterior panel 280 includes conical projections (not shown) which make a press fit with holes 300 formed in the front wall 42 of the base 30. Likewise, one of the rear panels 282a includes conical projections 302 which make a press fit with holes 303 formed in the back wall 72 of the rear sub-chassis 34. The other rear panel 282b includes bottom hooks 304 which fit into corresponding slots formed in the rear fence plate 270. The upper edge 306 of that rear panel 282b is arranged to be covered by the upper portion of the other rear panel 282a to hold the upper edge 306 in place.

Figure 6:
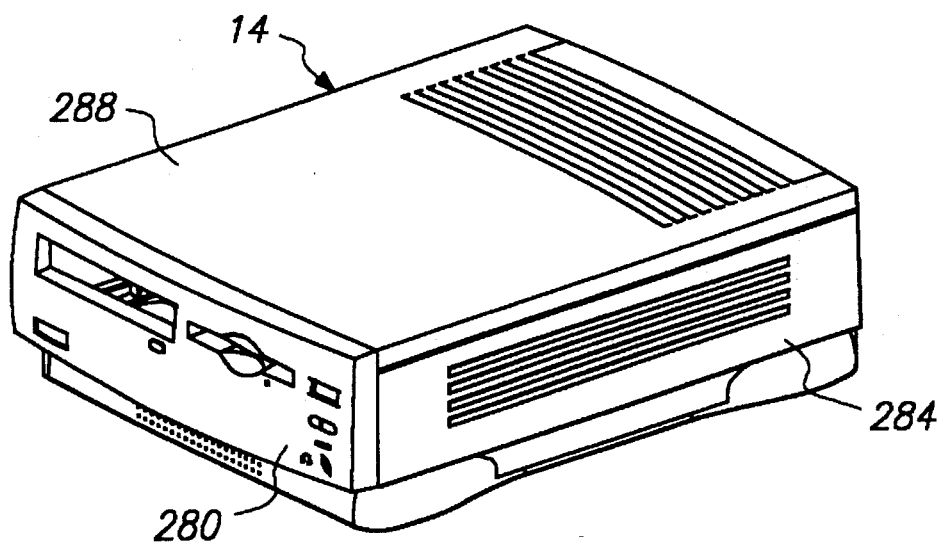
FIG. 6 is a top perspective view of a computer after being configured according to FIG. 5.
Figure 7:
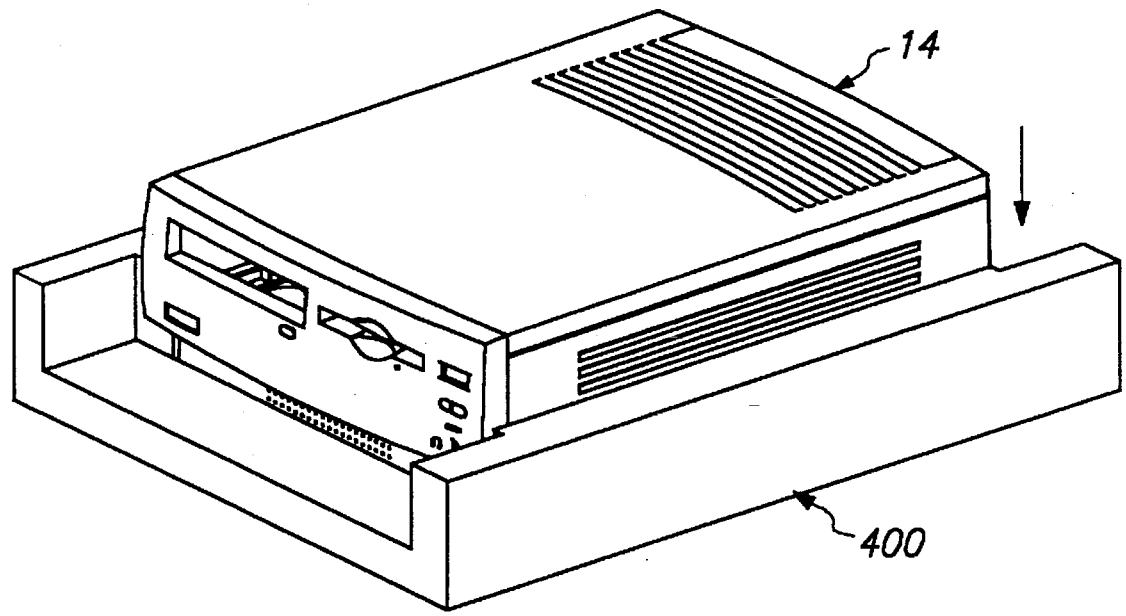
FIG. 7 is a top perspective view of a computer of FIG. 6 which has been inserted into a piece of packing material.
Figure 8:
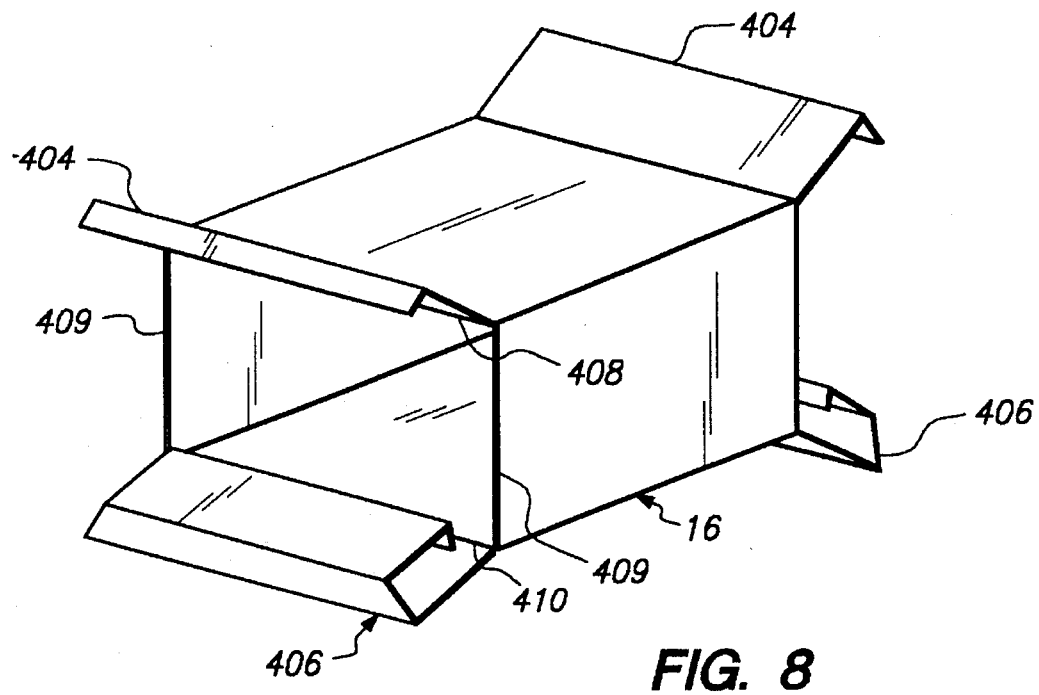
FIG. 8 is a top perspective view of a shipping container for a computer according to the present invention.
Figure 9:
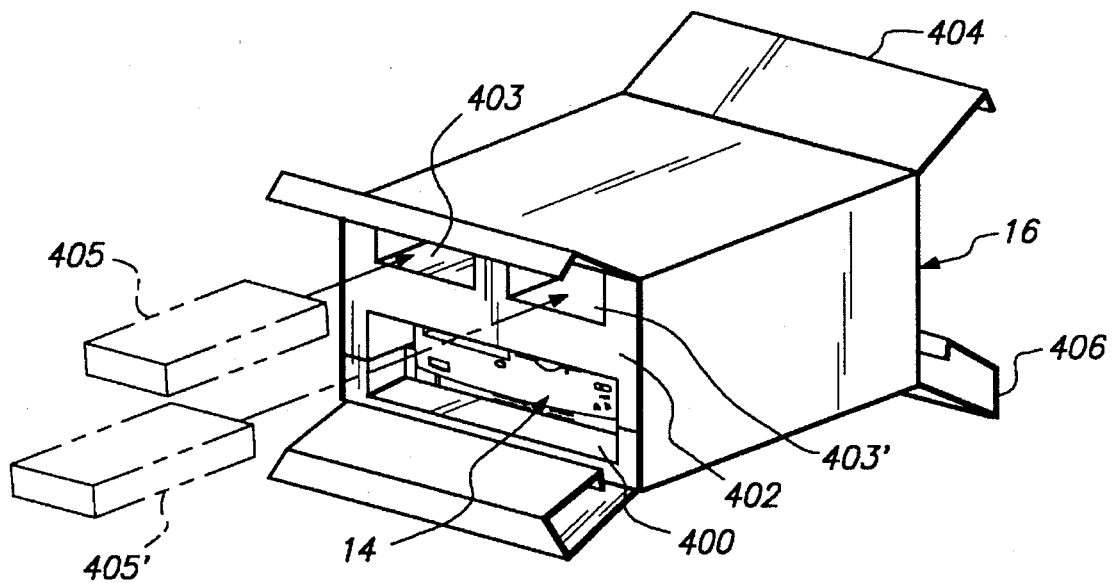
FIG. 9 is a view similar to FIG. 8, after the computer and top and bottom pieces of packing material have been inserted therein, and further depicting in phantom, the insertion of computer accessories.
Figure 10:
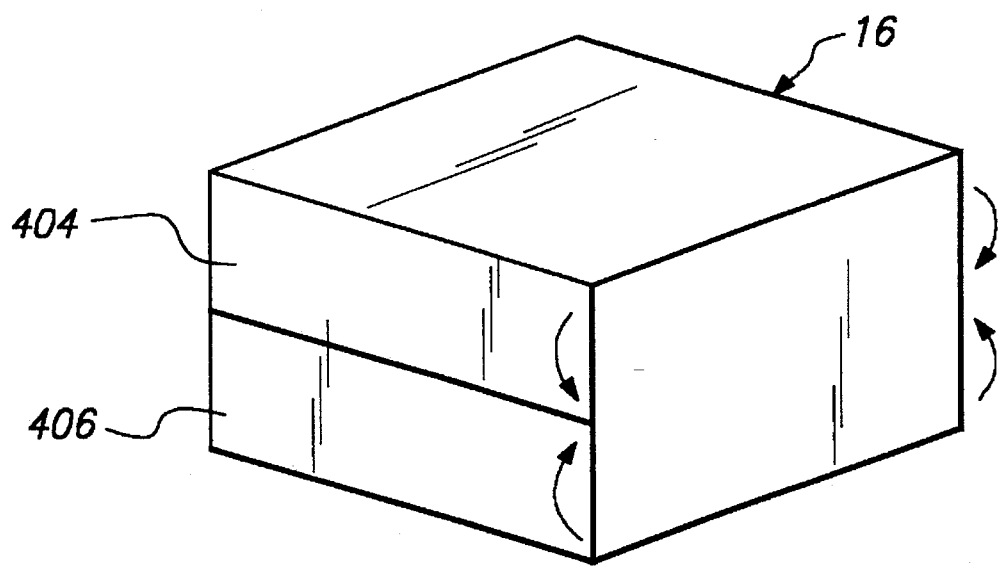
FIG. 10 is a view similar to FIG. 9 after closable flaps of the container have been closed.

The thus-configured computer 14, depicted in FIG. 6, is then seated in a piece of packing material (e.g. styrofoam) 400 (see FIG. 7), and the computer/packing unit 14,400 is slid into one of the shipping containers 16 (see FIGS. 9–10). Another piece 402 of packing material is disposed atop the computer 14. That upper packing piece 402 includes compartments 403, 403' for receiving computer accessories 405, 405', such as keyboards, extra drives, etc.

Each end of the container 16 includes a pair of closure flaps 404, 406 hinged about upper and lower horizontal edges 408, 410, respectively, of the container. For example, the container 16 could be formed of cardboard, with the flaps 404, 406 forming integrally hinged portions thereof. Alternatively, the flaps could be hinged about the vertical side edges 409 of the container.

Figure 11:
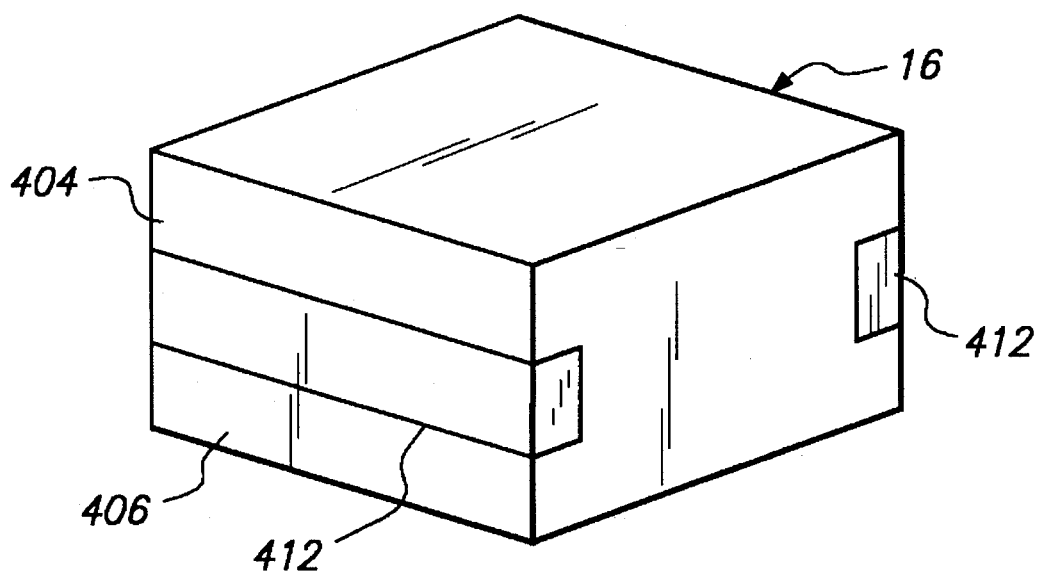
FIG. 11 is a view similar to FIG. 10 after tape has been applied to retain the closable flap closed.

Once the computer 14 has been installed in the container, the flaps can be closed (see FIG. 10) and then sealed with tape 412 (see FIG. 11), and the container 16 shipped. If, however, it becomes necessary to reconfigure the computer prior to shipment, the flaps 404, 406 are reopened and the necessary reconfiguring is performed (see FIG. 12). Such reconfiguring can be done without having to remove the computer 14 or packing material 400, 402 from the container 16, and without having to bend over into the container, and without having to substantially disassemble the computer.

Figure 12:
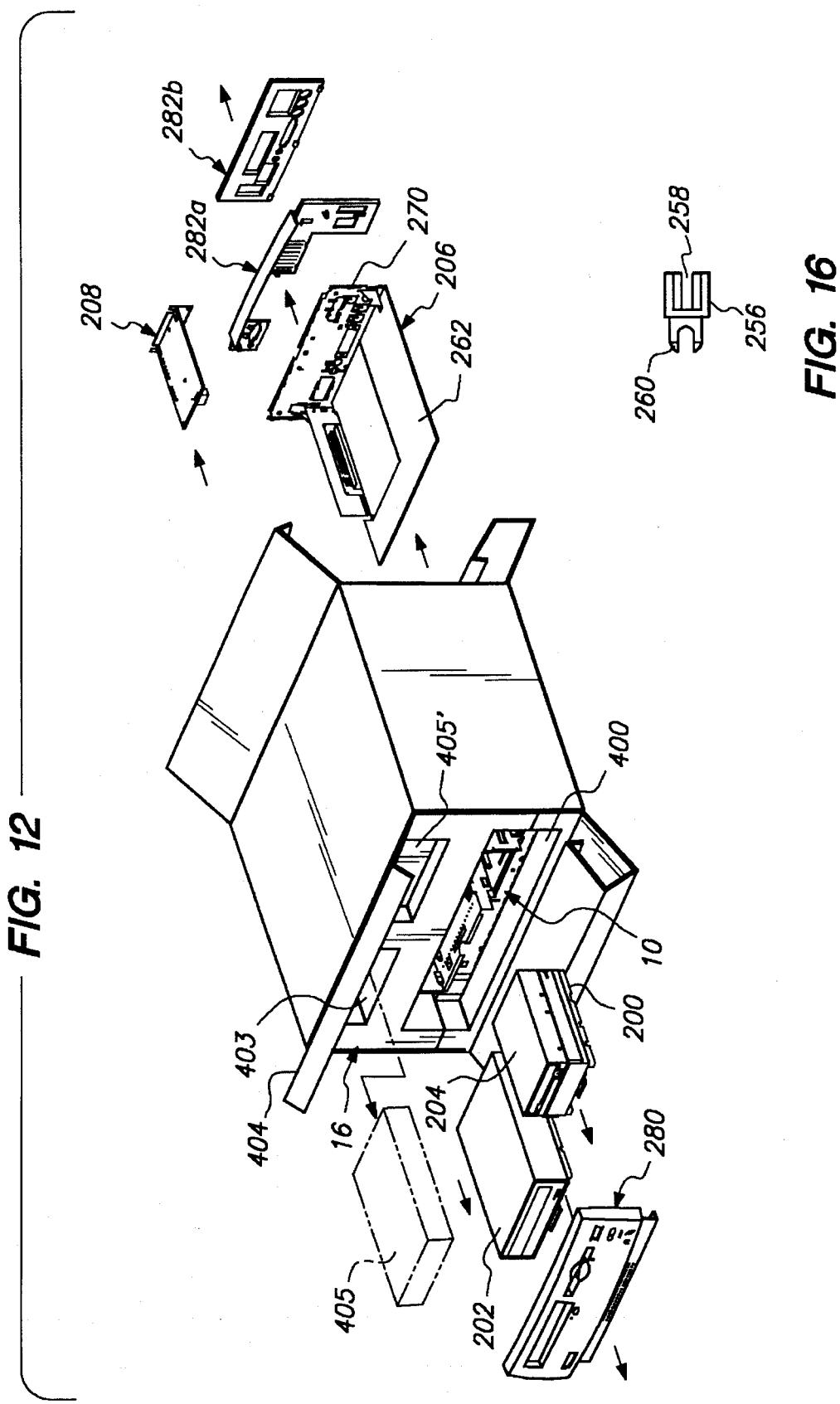
FIG. 12 is a top perspective view of the container of FIG. 10 after the flaps have been reopened, and the computer is in the process of being reconfigured in accordance with the present invention.

Rather, it will be appreciated, with reference to FIG. 12 that even with the computer 14 disposed within the container 16, the following changes (reconfiguring) can be performed:

1) remove and replace the front and rear decorative panels 280, 282a, 282b;

2) remove, and/or replace, and/or install the CD assembly 202, the hard drive 200, the floppy drive 204, logic board assembly 250, and TV tuner board 208;

3) remove, and/or replace, and/or install, either or both of the computer accessories 405, 405'.

Hence, a considerable amount of reconfiguring of electrical components of the computer, and a limited reconfiguring of the aesthetic appearance of the computer, can be performed while the computer remains in the shipping container 16.

Eventually, the flaps 404, 406 of the shipping container 16 are reclosed (FIG. 10), and the tape 412 is applied to secure the flaps (see FIG. 11), and the container 16 is shipped to a distribution site. It will be appreciated that further reconfiguring of the computer of the nature described above can also be performed at the distribution site, without having to remove the computer from the container 16.

It will be appreciated that while the electrical components are inventoried at the configuring sites B, C, some of the housing parts, such as the fence plate 270, the tracks 254, 256 and the panels 280, 282a, 282b, 284, 286, 288 could be inventoried at the mass production site A and shipped in the containers 12.

Among the advantages of the present invention are the following. The manufacture and assembly of the housings 10 at the central mass production factory A is a low-tech operation involving the shaping and assembly of shaped structural parts and thus can be performed economically by lower skilled workers.

At the configuration sites B, C, etc., where the installation of electrical components is performed, more expensive, higher-skilled workers are required, but the amount of labor required of them is minimized, because they do not have to manufacture or assembly the housing parts.

Also, the configuring of the computers at the configuring sites B, C can be performed quickly, so computers can be supplied to the purchasers more quickly after an order has been placed. Since much reconfiguring of the computers can be performed by workers without having to remove the computers from their shipping containers, and without having to bend over to reach into the container, such reconfiguring can be performed with minimal effort and risk of back injury.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A method of handling a personal computer, comprising the steps of:
    A) assembling a personal computer by installing electrical components into a housing;
    B) packaging said personal computer in a shipping container having an openable vertical end wall; and
    C) reconfiguring said packaged computer by removing at least one of said electrical components horizontally through a vertical side of said housing and horizontally through said vertical end wall of said container while said computer remains disposed in said container.

2. The method according to claim 1, wherein said step of installing electrical components includes installing at least one of: a hard drive, a floppy drive, and a logic board.

3. The method according to claim 1, wherein step A includes mounting exterior panels on at least first and second sides of said housing; step C including replacing at least one of said exterior panels through said end wall of said container.

4. The method according to claim 1 further including, prior to step A, the steps of assembling said housing at a first site remote from a second site where step A is performed, and shipping said housing from said first site to said second site where said electrical components are installed.

5. The method according to claim 4, wherein said step of assembling said housing comprises assembling a sub-chassis vertically downwardly into a metallic base and installing a metallic top cover onto said base; step A including inserting said at least one electrical component into a compartment defined by said sub-chassis.

6. The method according to claim 1, wherein step A comprises installing an electrical component into said housing through each of first and second vertical sides of said housing; step B comprising packaging said personal computer into said shipping container having first and second openable vertical end walls for covering said first and second vertical sides, respectively of said computers; and step C comprising reconfiguring said packaged computer by changing at least one of said horizontally installed electrical components through a respective one of said vertical end walls.

7. The method according to claim 1, wherein step C comprises exchanging said at least one electrical component for a different electrical component.

8. The method according to claim 1, wherein step B includes inserting packing material into said container, and step C includes reconfiguring said packaged computer without removing said packing material.

9. A method of handling a personal computer, comprising the steps of:
    A) assembling a plurality of housings at a first site;
    B) shipping said plurality of housings in a common container to a second site remote from said first site;
    C) installing electrical components into said housing at said second site;
    D) packaging said personal computers into individual shipping containers at said second site, each shipping container having an openable end wall;
    E) reconfiguring at least some of said packaged personal computers by removing at least one of said horizontally installed electrical components through a vertical side of said housing and horizontally through said vertical end wall of said individual container while said personal computer remains disposed in said individual container;
    F) closing said end wall of said individual container; and
    G) shipping said individual container and said reconfigured personal computer contained therein.

10. The method according to claim 9, wherein said step of installing electrical components into said housing comprises installing at least two of: a hard drive, a floppy drive, a logic board, and a T.V. tuner board.

11. The method according to claim 9, wherein step C further comprises mounting exterior panels on at least first and second sides of said housing; step E further comprising replacing at least one of said exterior panels through said vertical end wall of said container.

12. The method according to claim 9, wherein step A comprises assembling a sub-chassis vertically downwardly into a metallic base and installing a metallic top cover into said base; step C comprising horizontally installing at least one of said horizontally installable electrical components into a compartment defined by said sub-chassis.

13. The method according to claim 9, wherein step D includes inserting packing material into said container, and step E includes reconfiguring said packaged computers while said packing material remains in said containers.

\* \* \* \* \*